United States Patent
Zess et al.

(10) Patent No.: US 9,366,144 B2
(45) Date of Patent: Jun. 14, 2016

(54) TRAILING EDGE COOLING

(75) Inventors: Gary A. Zess, Vernon, CT (US); Brandon W. Spangler, Vernon, CT (US); Dominic J. Mongillo, Jr., West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 1122 days.

(21) Appl. No.: 13/424,752

(22) Filed: Mar. 20, 2012

(65) Prior Publication Data

US 2013/0251538 A1    Sep. 26, 2013

(51) Int. Cl.
*F01D 5/18* (2006.01)

(52) U.S. Cl.
CPC .......... *F01D 5/187* (2013.01); *F05D 2240/304* (2013.01); *F05D 2260/2212* (2013.01); *F05D 2260/22141* (2013.01); *Y02T 50/673* (2013.01); *Y02T 50/676* (2013.01); *Y10T 29/49337* (2015.01)

(58) Field of Classification Search
CPC ... F01D 5/187; F01D 5/288; Y10T 29/49337; Y02T 50/673; Y02T 50/676; F05D 2260/2212; F05D 2260/22141; F05D 2240/304
USPC ....................... 415/115; 416/95, 97 R, 241 R
See application file for complete search history.

(56) References Cited

U.S. PATENT DOCUMENTS

| | | | |
|---|---|---|---|
| 4,407,632 A | 10/1983 | Liang | |
| 4,839,237 A * | 6/1989 | Coulon et al. | ............... 428/610 |
| 5,288,207 A | 2/1994 | Linask | |
| 5,337,805 A | 8/1994 | Green et al. | |
| 5,368,441 A | 11/1994 | Sylvestro et al. | |
| 5,669,759 A | 9/1997 | Beabout | |
| 5,771,577 A * | 6/1998 | Gupta et al. | ............. 29/889.721 |
| 5,851,105 A | 12/1998 | Fric et al. | |
| 6,179,565 B1 | 1/2001 | Palumbo et al. | |
| 6,210,488 B1 * | 4/2001 | Bruce | ............................... 134/1 |
| 6,234,754 B1 * | 5/2001 | Zelesky et al. | ............. 416/97 R |
| 6,481,966 B2 * | 11/2002 | Beeck et al. | ................ 416/97 R |
| 7,021,893 B2 | 4/2006 | Mongillo, Jr. et al. | |
| 7,156,620 B2 * | 1/2007 | Papple | ........................ 416/96 R |

(Continued)

FOREIGN PATENT DOCUMENTS

| EP | 0140257 A1 | 5/1985 |
|---|---|---|
| EP | 2143883 A1 | 1/2010 |

(Continued)

OTHER PUBLICATIONS

The International Search Report and Written Opinion of counterpart International Application No. PCT/US2013/032899 filed Mar. 19, 2013.

(Continued)

*Primary Examiner* — Igor Kershteyn
*Assistant Examiner* — Aaron R Eastman
(74) *Attorney, Agent, or Firm* — Kinney & Lange, P.A.

(57) ABSTRACT

An airfoil includes a leading edge, a trailing edge, a suction surface, a pressure surface, a cooling passageway, and a plurality of oblong pedestals. The suction surface and the pressure surface both extend axially between the leading edge and the trailing edge, as well as radially from a root section to a tip section of the airfoil. The cooling passageway is located between the suction surface and the pressure surface. The oblong pedestals connect the suction surface to the pressure surface at the trailing edge of the airfoil.

20 Claims, 8 Drawing Sheets

(56) References Cited

U.S. PATENT DOCUMENTS

| | | |
|---|---|---|
| 7,175,386 B2 | 2/2007 | Cherolis et al. |
| 7,438,527 B2 | 10/2008 | Albert et al. |
| 7,780,414 B1 | 8/2010 | Liang |
| 8,052,378 B2 | 11/2011 | Draper |
| 8,070,441 B1 | 12/2011 | Liang |
| 2003/0072878 A1* | 4/2003 | Fournes et al. ............... 427/250 |
| 2006/0239819 A1* | 10/2006 | Albert et al. ................ 416/97 R |
| 2008/0063524 A1 | 3/2008 | Tibbott |
| 2009/0142548 A1* | 6/2009 | Patterson et al. ............ 428/137 |
| 2010/0054915 A1 | 3/2010 | Devore et al. |
| 2010/0111704 A1* | 5/2010 | Hada .......................... 416/97 R |
| 2010/0143655 A1* | 6/2010 | Rosenzweig et al. ......... 428/161 |
| 2010/0255260 A1* | 10/2010 | Lee et al. ...................... 428/164 |
| 2011/0244138 A1* | 10/2011 | Schlichting et al. .......... 427/448 |

FOREIGN PATENT DOCUMENTS

| | | |
|---|---|---|
| EP | 2568119 A2 | 3/2013 |
| JP | H11311102 A | 11/1999 |

OTHER PUBLICATIONS

European Patent Office, The extended European search report, Oct. 14, 2015, 5 pages.

* cited by examiner

TRAILING EDGE COOLING

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines are also known, in a variety of spool configurations with traditional and variable cycle modes of operation.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

An airfoil includes a leading edge, a trailing edge, a suction surface, a pressure surface, a cooling passageway, and a plurality of oblong pedestals. The suction surface and the pressure surface both extend axially between the leading edge and the trailing edge, as well as radially from a root section of the airfoil to a tip section of the airfoil. The cooling passageway is located between the suction surface and the pressure surface. The oblong pedestals connect the suction surface to the pressure surface, and having a cut downstream end terminating at the trailing edge of the airfoil.

A component for a gas turbine engine includes an airfoil and a trailing edge cooling passageway. The airfoil includes a convex surface and a concave surface. Both the convex surface and the concave surface extend radially from an inner diameter to an outer diameter and axially from a leading edge to a trailing edge. Internal chambers are defined between the convex surface and the concave surface. The trailing edge cooling passageway extends axially through the internal chamber and has an outlet at the trailing edge. A radial column of axially elongated pedestals is positioned at the outlet of the trailing edge cooling passageway, such that the pedestals terminate at an exit plane of the trailing edge cooling passageway.

A method of manufacturing an airfoil can include forming a pedestal to include a rounded upstream end, a rounded downstream end, and tapered side walls connecting the upstream end to the downstream end. The method can also include coating the pedestal with a thermal coating thereby converting the tapered side walls into parallel side walls connecting the upstream end to the downstream end.

DETAILED DESCRIPTION

Figure 1:
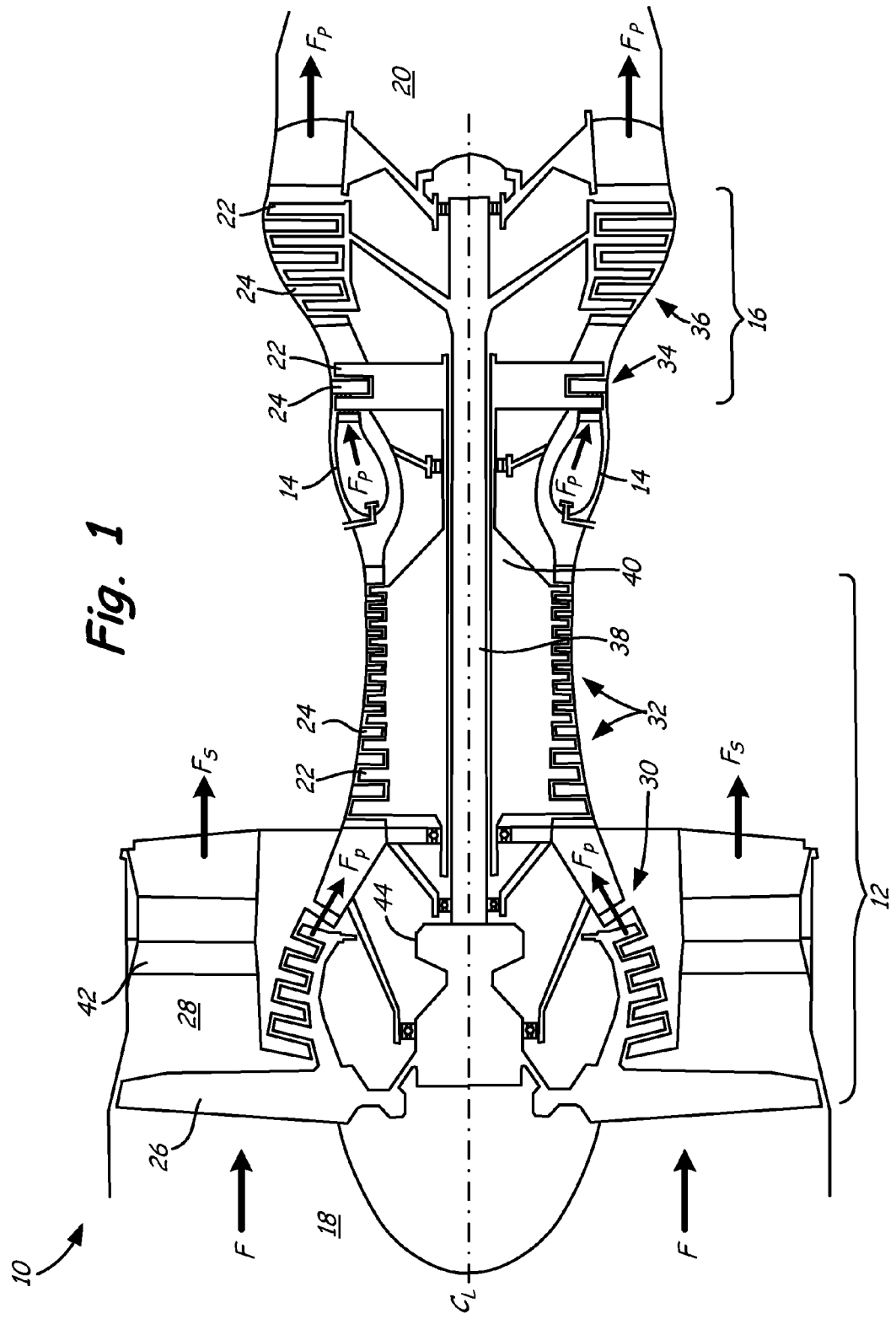
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but not limited to, cooled gas turbine engine components in compressor sections 30 and 32, combustor 14, turbine sections 34 and 36, and exhaust section 20 of gas turbine engine 10.

Figure 2A:
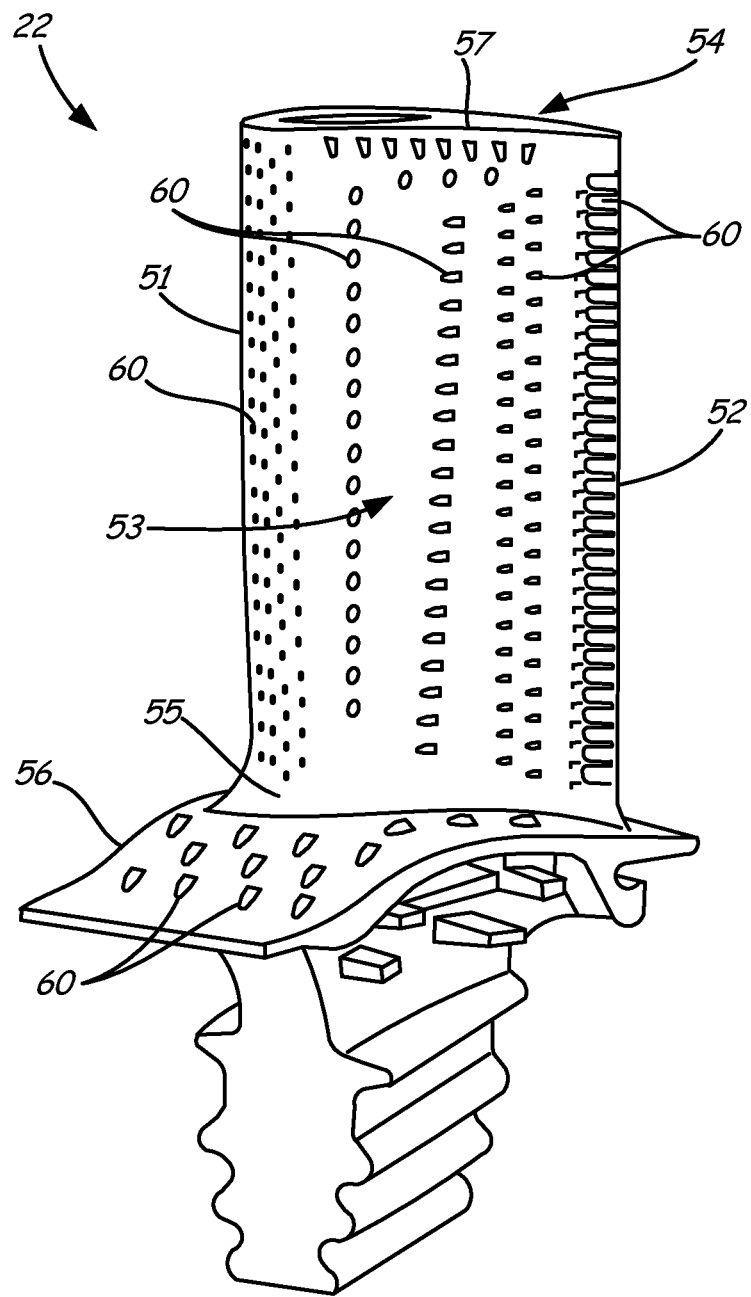
FIG. 2A is a perspective view of an airfoil for the gas turbine engine, in a rotor blade configuration.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

Figure 2B:
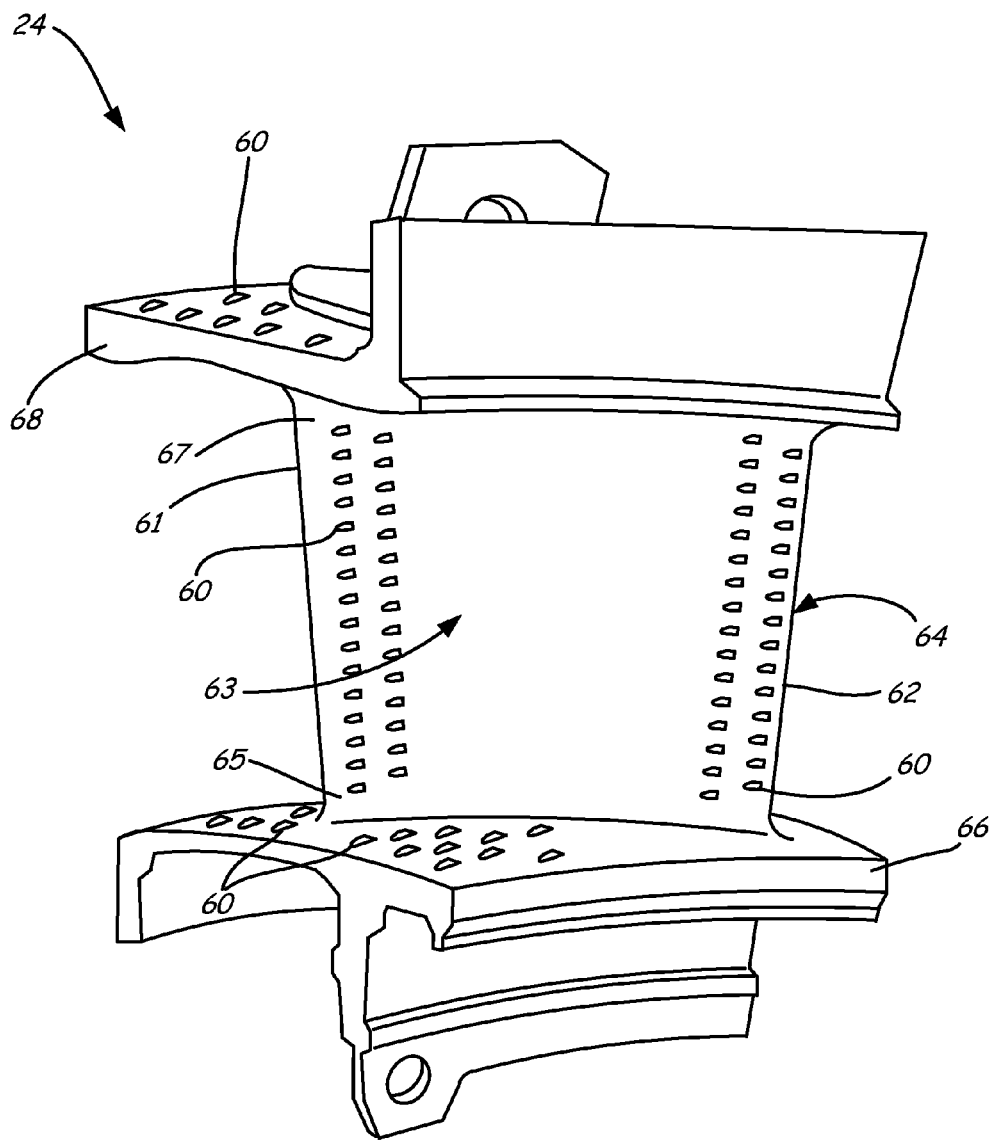
FIG. 2B is a perspective view of an airfoil for the gas turbine engine, in a stator vane configuration.

FIG. 2B is a perspective view of stator airfoil (or vane) 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or passages 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling passages and cooling holes 60 to reduce thermal fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the outer (gas path) surfaces from high temperature flow.

While surface cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation and corner effects. Cooling holes 60 reduce flow requirements and improve the spread of cooling fluid across the hot outer surfaces of airfoils 22 and 24, and other gas turbine engine components, so that less flow is needed for cooling and efficiency is maintained or increased.

Figure 3:
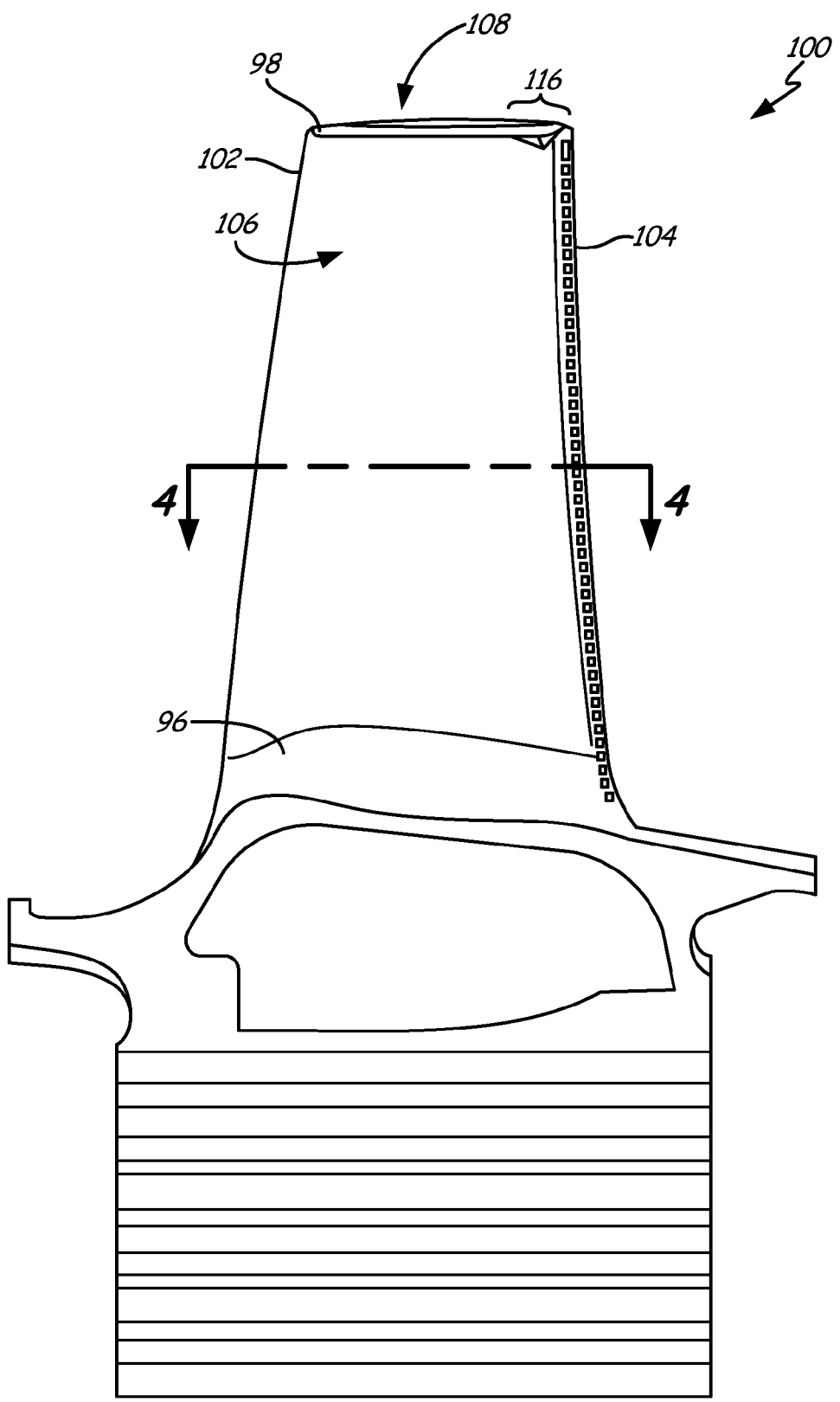
FIG. 3 is a perspective view of a rotor blade.
Figure 4:
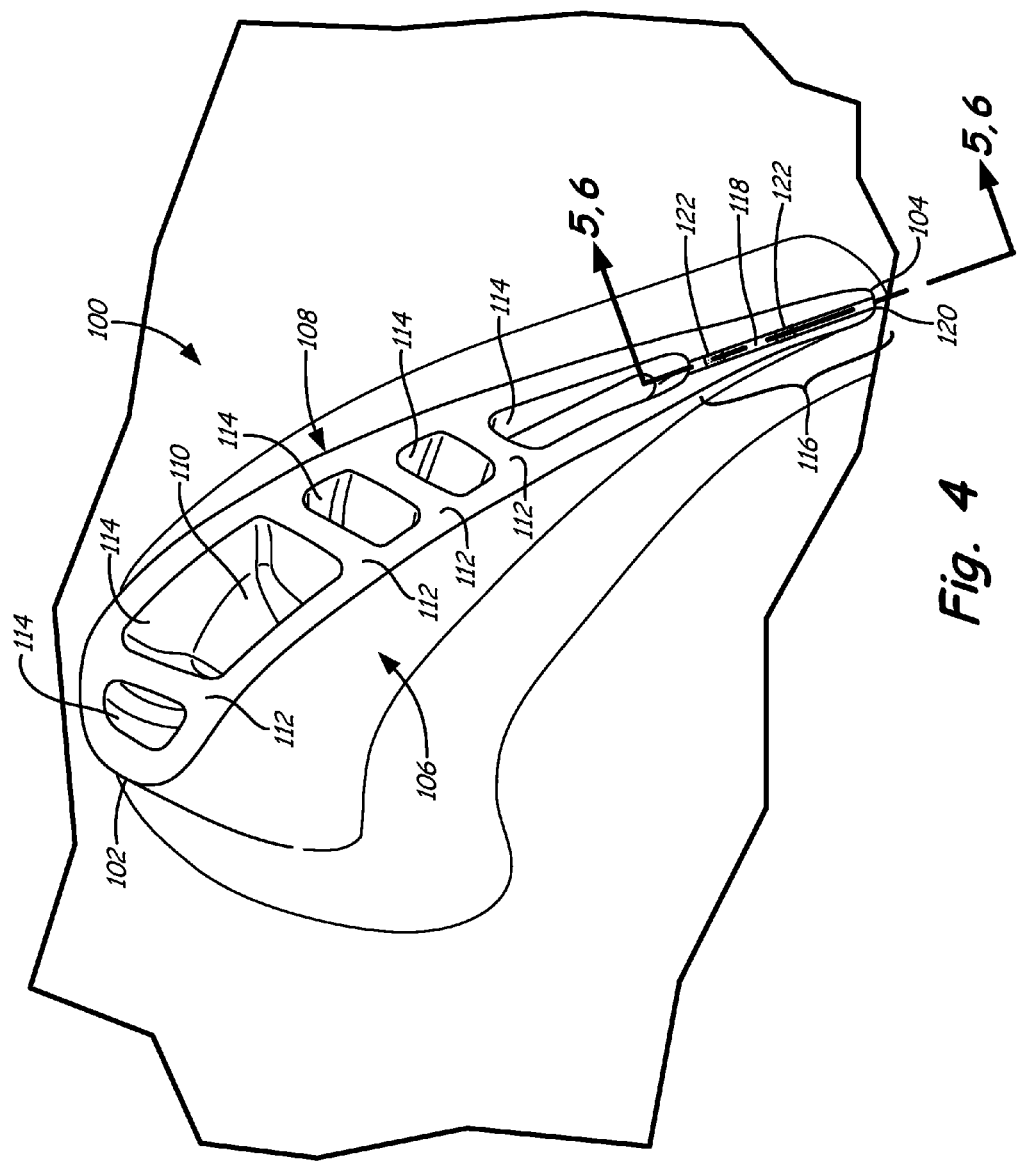
FIG. 4 is an axial cross-sectional view of the rotor blade from FIG. 3.

FIG. 3 is a perspective view of rotor blade 100 and FIG. 4 is an axial cross-sectional view of rotor blade 100. Rotor blade 100 includes root section 96, tip section 98, leading edge 102, trailing edge 104, pressure or concave surface 106, suction or convex surface 108, cavity 110, internal walls 112, cooling passageways 114, trailing edge section 116, cooling chamber 118, outlet 120, and pedestals 122. Cooling passageways 114 provide cooling fluid for leading edge 102 and a mid-chord region of rotor blade 100, while cooling chamber 118 provides cooling fluid for trailing edge section 116 of rotor blade 100.

Rotor blade 100 is similar to rotor airfoil 22 described above with reference to FIG. 2A. Rotor blade 100 extends axially from leading edge 102 to trailing edge 104, with trailing edge 104 located downstream of leading edge 102. Pressure surface (front) 106 and suction surface (back) 108 form the major opposing surfaces or walls of rotor blade 100. Pressure surface 106 and suction surface 108 both extend axially between leading edge 102 and trailing edge 104, and radially from an inner diameter (ID) or root section 96 to an outer diameter (OD or tip section 98. The axial cross-sectional view of FIG. 4 was taken along line 4-4, which is located mid-blade at a central location between root section 96 and tip section 98.

Pressure surface 106 and suction surface 108 join leading edge 102 to trailing edge 104 and define a hollow, central cavity 110 of rotor blade 100. A plurality of internal walls 112 extends transversely across cavity 110 from pressure surface 106 to suction surface 108 and connect pressure surface 106 to suction surface 108. Internal walls 112 divide cavity 110 into a plurality of cooling passageways 114 that extend through a majority of rotor blade 100. Cooling passageways 114 are spaced axially from a location near leading edge 102, through a mid-chord region, to trailing edge region 116. Cooling passages 114 can be straight or serpentine and can take a plurality of different shapes. As described with reference to FIGS. 3 and 4, cooling fluid (e.g. compressor air) flows radially through cooling passageways 114 to cool rotor blade 100.

Trailing edge region 116 has a cooling scheme including cooling chamber 118. Cooling chamber 118 is an area of central cavity 110 located in trailing edge region 116 of rotor blade 100. Cooling chamber 118 is bounded radially by the root section and tip section, bounded axially by cooling passageway 114 and trailing edge 104, and bounded transversely by pressure surface 106 and suction surface 108. At trailing edge 104, cooling chamber 118 terminates in outlet 120, where a portion of cooling air exits rotor blade 100 to mix with hot working fluid. Extending transversely across cooling chamber 118 is a plurality of pedestals 122. Pedestals 122 extend from attachments to internal walls of pressure surface 106 and suction surface 108. While pedestals 122 are shown and described with reference to rotor blade 100 airfoil configuration, they are equally applicable to a stator vane airfoil configuration (e.g. stator vane 24 shown in FIG. 2B). The structure and function of pedestals 122 are described in detail below with reference to FIGS. 4-6.

Figure 5:
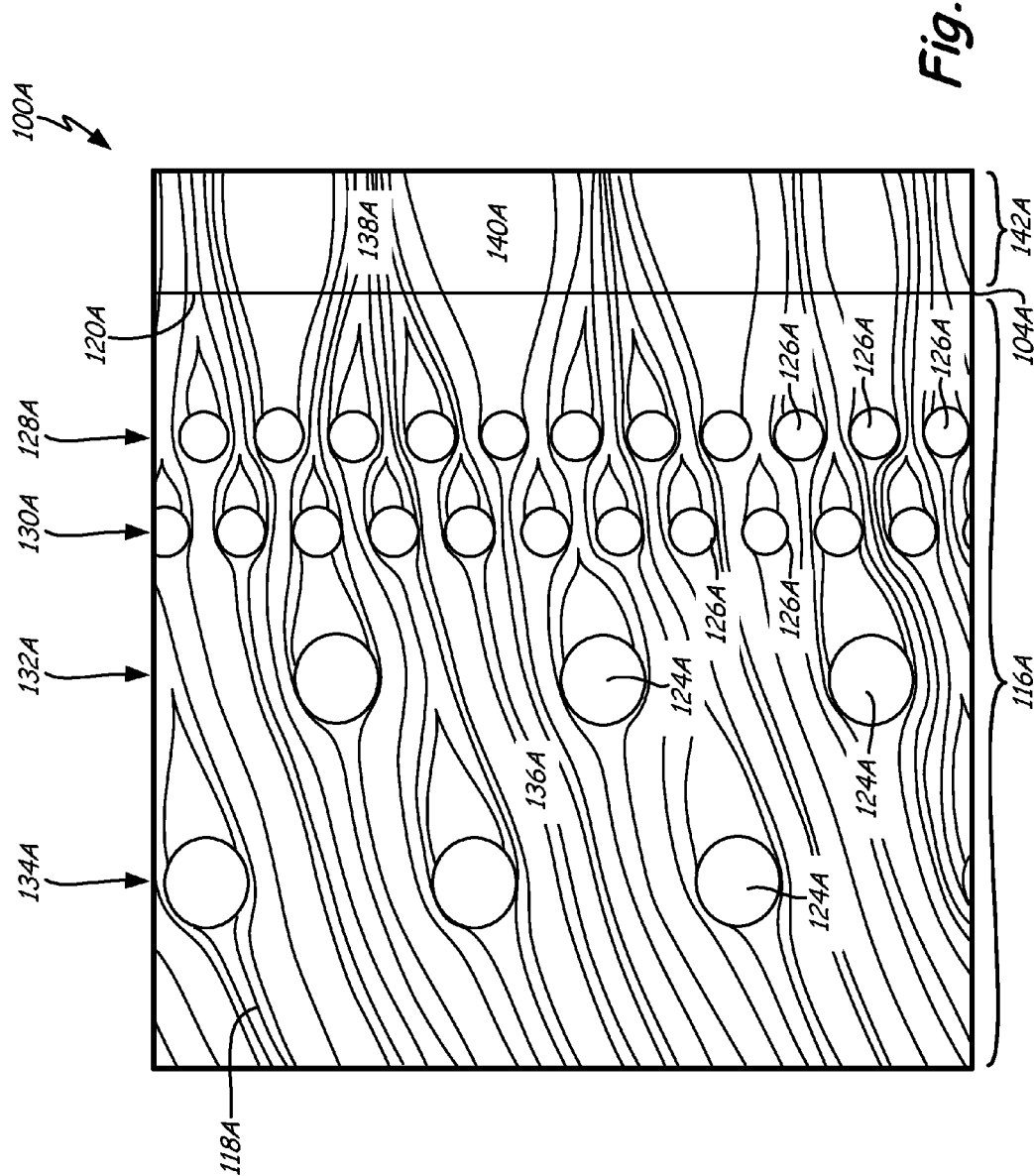
FIG. 5 is a radial cross-sectional view of the rotor blade from FIG. 4 showing a first cooling scheme for the trailing edge.

FIG. 5 is a radial cross-sectional view of rotor blade 100A showing a first cooling scheme for trailing edge region 116A. Rotor blade 100A includes trailing edge 104A, trailing edge region 116A, cooling chamber 118A, outlet 120A, pedestals 122A (including upstream pedestals 124A and downstream pedestals 126A) arranged in first column 128A, second column 130A, third column 132A, and fourth column 134A. Streamlines 136A depict cooling fluid flowing through cooling chamber 118A past pedestals 122A in trailing edge region 116A. As streamlines 136A approach trailing edge 104A they merge into high mach streams 138A spaced apart by low mach streams 140A, which result in relatively large mixing downstream of rotor blade 110A.

As described above with reference to FIGS. 3 & 4, trailing edge 104A is the most axially downstream aspect of rotor blade 100A. FIG. 5 is a radial cross section taken along line 5-5 of FIG. 4. As shown in FIG. 5, trailing edge 104A is the terminal portion of trailing edge section 116A. Cooling chamber 118A is a generally open or hollow area defined within trailing edge region 116A that terminates with outlet 120A at trailing edge 104A. Outlet 120A is open and continuous along trailing edge 104A. Located within cooling chamber 118A is a plurality of pedestals 122A. Pedestals 122A of FIG. 4 come in two varieties: upstream pedestals 124A and downstream pedestals 126A. Both upstream pedestals 124A and downstream pedestals 126A are cylindrical in shape and circular in cross section such that each has a diameter, though other shaped cross sections are contemplated. Upstream pedestals 124A have a larger diameter (e.g. about 30-50 mils or 0.76-1.27 millimeters) than downstream pedestals 126A (e.g. about 17-27 mils or 0.43-0.69 millimeters), such that a size ratio of upstream pedestal 124A to downstream pedestal 126A is between about 3:1 and about 2:1. In the depicted embodiment, upstream pedestals 124A are about 40 mils (about 1.02 millimeters) while downstream pedestals 126A are about 17 mils (about 0.43 millimeters), such that the ratio upstream pedestal 124A size to downstream pedestal size is about 2.25:1, although the disclosure is not so limited.

Pedestals 122A are arranged into vertical or radial columns. Downstream pedestals 126A are arranged into two columns: first column 128A and second column 130A. Upstream pedestals 124A are also arranged into columns, two of which are shown: third column 132A and forth column 134A. Fourth column 134A, third column 132A, second column 130A, and first column 128A all extend substantially parallel to one another, and serially effect fluid flow streamlines 136A. First column 128A is the downstream-most column and is spaced a short distance from trailing edge 104A. Second column 130A is located between, and spaced a short distance from, first column 128A and third column 132A. Similarly, third column 132A is located between, and space a short distance from, second column 130A and fourth column 134A. Fourth column 134A is the upstream most column shown, although more or less columns are possible.

First column 128A and second column 130A are more or less identical in that they both include the smaller downstream pedestals 126A with substantially uniform sizing and spacing. The pedestals 126A of second column 130A are offset from the pedestals 126A of first column 128A so that a space between pedestals 126A of second column 130A is axially aligned with a pedestal 126A of first column 128A and vice versa. Third column 132A and fourth column 134A are more or less identical in that they both include the larger upstream pedestals 124A with substantially uniform sizing and spacing. The pedestals 124A of fourth column 134A are offset from the pedestals 124A of third column 132A so that a space between pedestals 124A of fourth column 134A is axially aligned with a pedestal 124A of third column 132A and vice versa. Downstream pedestals 126A are more densely packed in first column 128A and second column 130A than upstream pedestals 124A are packed in third column 132A and fourth column 134A. In the depicted embodiment, for every one upstream pedestal 124A in third column 132A there are four downstream pedestals 126A in second column 130A and four downstream pedestals 126A in first column 128A. The spacing between pedestal columns (fourth column 134A, third column 132A, second column 130A, and first column 128A) is between about 2-3 pedestal diameters, while the spacing between the fourth column 128A and trailing edge 104A is between about 2.5-3.5 pedestal diameters.

Pedestals 122A add convective heat transfer surface area to trailing edge region 116A, while partially blocking cooling fluid flow. Streamlines 136A show how cooling fluid (e.g. compressor air) flows through cooling chamber 118A. The cooling fluid travels axially across cooling chamber 118A through spaces or slots between pedestals 122A. Cooling fluid encounters fourth column 134A having upstream pedestals 124A, and then third column 132A having upstream pedestals 124A. As shown by streamlines 136A, cooling fluid passes through upstream pedestals 124A, which partially block fluid flow. Cooling fluid then encounters second column 130A having downstream pedestals and lastly, first column 128A having downstream pedestals 126A. Again, cooling fluid snakes around downstream pedestals 126A, which partially block fluid flow.

Just downstream of first column 128A, but upstream of trailing edge 104A, streamlines 136A merge. More specifically, after fluid passes between downstream pedestals 126A of first column 128A in distinct streams, some combination of the distinct streams merge into a single fluid stream to exit outlet 120A. This single fluid stream becomes high mach stream 138A once cooling fluid exits outlet 120A of cooling chamber 118A to space 142A beyond trailing edge 104A. This pattern of merging streams is repeated radially along trailing edge 104A, such that each high mach stream 138A is spaced radially from another high mach stream 138A. Located between any two high mach streams 138A are low mach or separated streams 140A. The disparity in velocity between high mach streams 138A and low mach streams 140A is great, as evidenced by density of the streamlines 136A. This unevenness of cooling fluid flow exiting outlet 120A at trailing edge 104A results in relatively large mixing losses between cooling fluid flow and working fluid in space 142A downstream of the trailing edge 104A.

Figure 6:
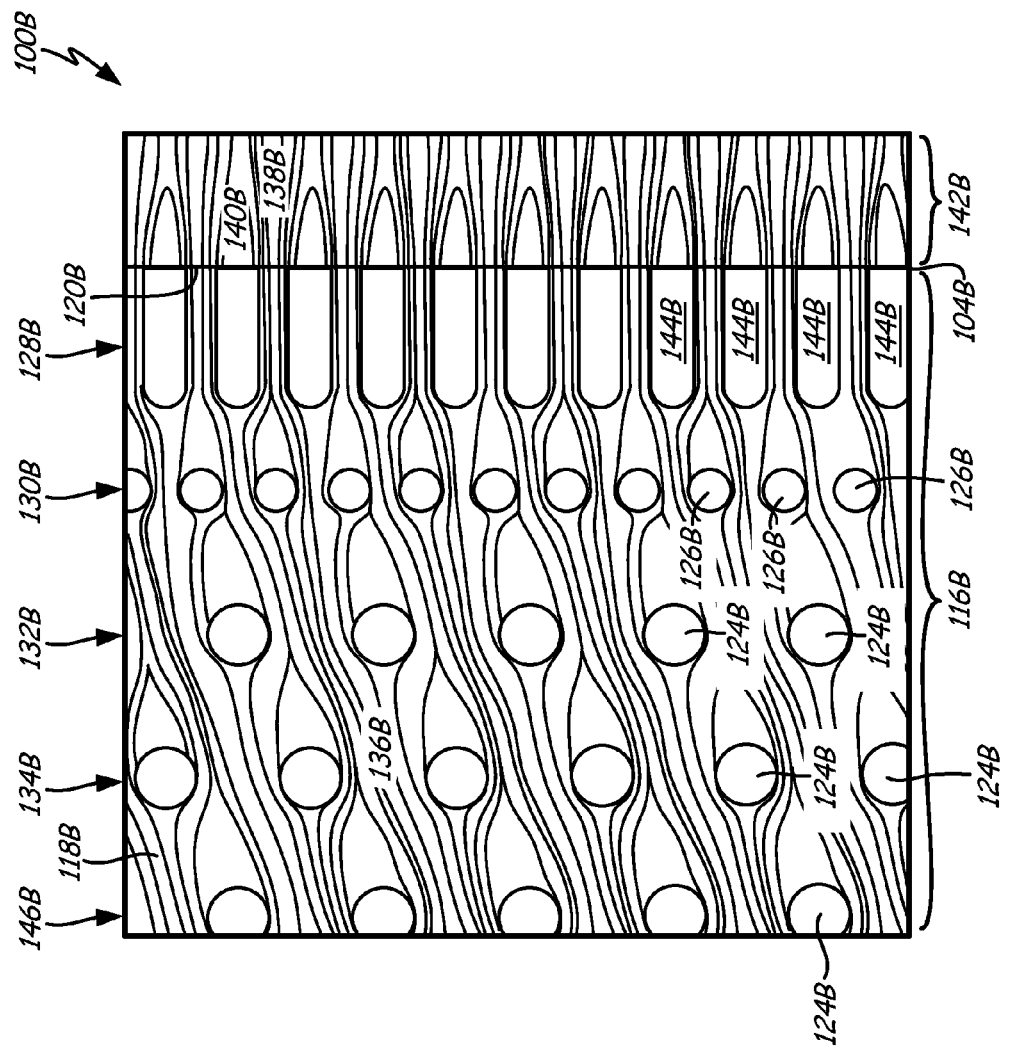
FIG. 6 is a radial cross sectional view of the rotor blade from FIG. 4 showing a second cooling scheme for the trailing edge.

FIG. 6 is a radial cross sectional view of rotor blade 100B showing a second cooling scheme for trailing edge region 116B. Rotor blade 100B includes trailing edge 104B, trailing edge region 116B, cooling chamber 118B, outlets 120B, pedestals 122B (including upstream pedestals 124B, downstream pedestals 126B, and terminal pedestals 144B) arranged in first column 128B, second column 130B, third column 132B, fourth column 134B, and fifth column 146B. Streamlines 136B depict cooling fluid flowing through cooling chamber 118B past pedestals 122B in trailing edge region 116B. As streamlines 136B approach trailing edge 104B they encounter terminal pedestals 144B, which keep fluid flow streams separate and unable to merge. Higher mach streams 138B and lower mach streams 140B are visible, but terminal pedestals 144B result in more uniform jets of fluid with little to no mixing losses in space 142B downstream of rotor blade 100B.

As described above with reference to FIGS. 3 & 4, trailing edge 104B is the most axially downstream aspect of rotor blade 100B. FIG. 6 is a radial cross sectional view taken on line 6-6 of FIG. 4. As shown in FIG. 6, trailing edge 104B is the terminal portion of trailing edge section 116B. Cooling chamber 118B is a generally open or hollow area defined within trailing edge region 116B that terminates with outlets 120B at trailing edge 104B. Outlets 120B are open to trailing edge 104B, but spaced apart axially by terminal pedestals 144B. Located within cooling chamber 118B is a plurality of pedestals 122B. Pedestals 122B of FIG. 6 come in three varieties: upstream pedestals 124B, downstream pedestals 126B, and terminal pedestals 144B. Both upstream pedestals 124B and downstream pedestals 126B are cylindrical in shape and circular in cross section such that each has a diameter, though other shaped cross sections are contemplated. Upstream pedestals 124B have a larger diameter (e.g. about 16-36 mils/0.41-0.91 millimeters) than downstream pedestals 126B (e.g. about 17-27 mils/0.43-0.69 millimeters), such that a size ratio of upstream pedestal 124B to downstream pedestal 126B is between about 2:1 and 1:1. In the depicted embodiment, upstream pedestals 124B are about 26 mils (0.66 millimeters) while downstream pedestals 126B are about 17 mils (0.43 millimeters), such that the ratio upstream pedestal 124B size to downstream pedestal size is about 1.5:1, although the disclosure is not so limited.

Terminal pedestals 144B are not circular cylinders or circular in cross section like upstream pedestals 124B and downstream pedestals 126B. Instead, terminal pedestals 144B are elongated axially to be oblong in shape. An upstream end of each terminal pedestal 144B appears semi-circular in cross section while downstream end is angular and rectangular in cross section. Two substantially parallel walls connect the upstream end to the downstream end and form right angles with the downstream end (described further with respect to FIG. 7). The upstream end of each terminal pedestal 144B has a diameter, which can be similar or equal to the diameter of upstream pedestals 126B. In the depicted embodiment, the upstream end of each terminal pedestal 144B has a diameter of about 17 mils (0.43 millimeters), although the disclosure is not so limited.

Pedestals 122B are arranged into vertical or radial columns. Terminal pedestals 144B are arranged into one column: first column 128B. Similarly, downstream pedestals 126B are arranged into one column: second column 130B. Upstream pedestals 124B are also arranged into columns, three of which are shown: third column 132B, fourth column 134B, and fifth column 146B. Fifth column 146B, fourth column 134B, third column 132B, second column 130B, and first column 128B all extend substantially parallel to one another, and serially effect fluid flow streamlines 136B. First column 128B is the downstream most column and is aligned with trailing edge 104B such that the downstream end of each terminal pedestal 144B is in contact with trailing edge 104B. Second column 130B is located between, and spaced a short distance from, first column 128B and third column 132B. Similarly, third column 132B is located between, and spaced a short distance from, second column 130B and fourth column 134B. Likewise, fourth column 134B is located between, and spaced a short distance from, third column 132B and fifth column 146B. Fifth column 134B is the upstream-most column shown, although more or less columns are possible.

First column 128B includes a plurality of radially spaced terminal pedestals 144B with substantially uniform sizing and spacing. Second column 130A includes a plurality of radially spaced downstream pedestals 126B with substantially uniform sizing and spacing. The downstream pedestals 126B of second column 130B are offset from the terminal pedestals 144B of first column 128B so that a space between downstream pedestals 126B of second column 130B is axially aligned with a terminal pedestal 144B of first column 128B and vice versa. Third column 132B, fourth column 134B, and fifth column 146B are more or less identical in that they each include a plurality of radially spaced upstream pedestals 124B having substantially uniform sizing and spacing. Pedestals 124B of fifth column 146B are offset from pedestals 124B of fourth column 134B, which are offset from the pedestals 124B of third column 132B, which are offset from pedestals 126B of second column 130B so that fluid flow streamlines 136B pass between pedestals 124B and 126B. Terminal pedestals 144B are packed in first column 128B with a similar or same density as downstream pedestals 126B are packed in second column 130B. Both terminal pedestals 144B and downstream pedestals 126B are more densely packed than upstream pedestals 124B are packed in third column 132B, fourth column 134B, and fifth column 146B. In the depicted embodiment, for every one upstream pedestal 126B in third column 132B there are two downstream pedestals 126B in second column 130B and two terminal pedestals 144B in first column 128B. The spacing between pedestal columns (fifth column 146B, fourth column 134B, third column 132B, second column 130B, and first column 128B) is between about 2-3 pedestal diameters, while the spacing between the fourth column 128A and trailing edge 104A is between about 2.5-3.5 pedestal diameters.

Pedestals 122B add convective heat transfer surface area to trailing edge region 116B, while partially blocking cooling fluid flow. Streamlines 136B show how cooling fluid (e.g. compressor air) flows through cooling chamber 118B. The cooling fluid travels axially across cooling chamber 118B through spaces or slots between pedestals 122B. Cooling fluid encounters fifth column 146B having upstream pedestals 124B, fourth column 134B having upstream pedestals 124B, and then third column 132B having upstream pedestals 124B. As shown by streamlines 136B, cooling fluid passes through upstream pedestals 124B, which partially block fluid flow. Cooling fluid then encounters second column 130B having downstream pedestals 126B. Again, cooling fluid snakes around downstream pedestals 126B, which partially block fluid flow. Lastly, cooling fluid encounters first column 128B of terminal pedestals 144B. Due to their elongated shape, fluid is guided through pedestals 144B in a straight line to outlets 120B formed between terminal pedestals 144B at trailing edge 104B.

In comparison to FIG. 5, there is a distinct lack of streamlines merging in the cooling scheme of FIG. 6. More specifically, after fluid passes between downstream pedestals 126B of second column 130B, it will encounter a curved upstream end of terminal pedestals 144B. Fluid passes between terminal pedestals 144B, but cannot merge without any other stream since terminal pedestals 144B are elongated to trailing edge 104B. Streamlines 136B exit cooling chamber 118B at outlets 120B formed between the angular downstream ends of terminal pedestals 144B. Fluid exiting blade 100B at outlets 120B forms jets or high mach streams 138B, which better match the velocity of working fluid present in space 142B. Low mach streams 140B are observed in space 142B from blockage of terminal pedestals 144B, but are greatly reduced in size when compared to the cooling scheme of FIG. 5. Accordingly, terminal pedestals 144B provide a more uniform axial flow or jet pattern for cooling air exiting outlets 120B. This evenness or uniformity of cooling fluid flow results in little to no mixing loses between cooling fluid flow and working fluid in space 142B downstream of the trailing edge 104B of rotor blade 100B. Additional benefits include, but are not limited to, increasing mach number for cooling fluid exiting trailing edge 104B, and straightening of cooling fluid exiting trailing edge 104B.

Terminal pedestals 144B can be non diffusing in both the streamwise (radial direction) and chordwise (tangential direction) as designed for casting definition. In some embodiments, trailing edge slots (e.g. 120B) are aligned parallel to the external airfoil local trailing edge surface momentum boundary layer streamlines in order to minimize the momentum mixing loss associated with off axis coolant ejection. Such a design can result in terminal pedestals 144B being oriented in a non-axial direction to align with external streamlines.

Figure 7:
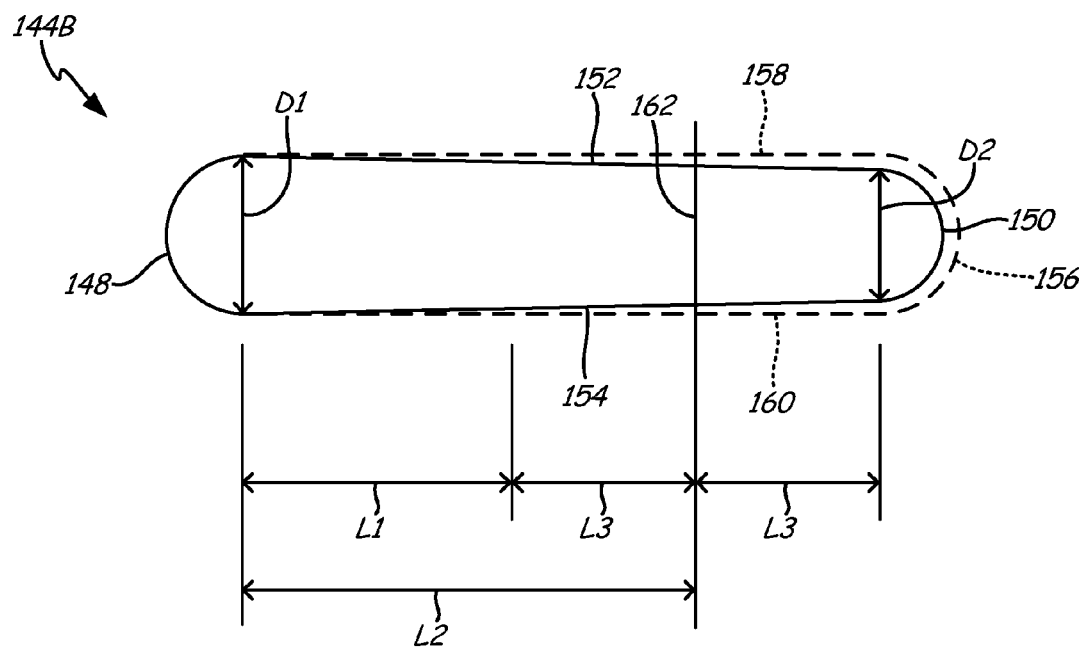
FIG. 7 is a diagram of a pedestal from the second cooling scheme.

FIG. 7 is a diagram of a single terminal pedestal 144B from the second cooling scheme. Terminal pedestal 144B includes upstream end 148, manufactured downstream end 150, manufactured upper wall 152, manufactured lower wall 154, coated downstream end 156, coated upper wall 158, coated lower wall 160, and cut downstream end 162. Also shown are two diameters (first diameter D1 and second diameter D2) and various lengths (first length L1, second length L2, and third lengths L3) relevant for manufacturing of terminal pedestal 144B.

When manufactured, terminal pedestal 144B is defined by upstream end 148, manufactured downstream end 150, manufactured upper wall 152, and manufactured lower wall 154 and has an oblong shape. Upstream end 148 is curved or semi-circular and has first diameter D1, which can be about 17 mils-27 mils (0.43-0.69 millimeters). In the depicted embodiment, first diameter D1 is about 17 mils (0.43 millimeters), although the disclosure is not so limited. Manufactured downstream end 150 is also curved or semi-circular and has second diameter D2. Second diameter D2 is about 0-4 mils (0-0.10 millimeters) less than first diameter D1. In the depicted embodiment, diameter D2 is about 2 mils (50.8 microns) less than diameter D1 (i.e. about 15 mils/0.38 millimeters). It is desirable to minimize first diameter D1 and second diameter D2. Manufactured upper wall 152 and manufactured lower wall 154 extend between and connect upstream end 148 to manufactured downstream end 150. In other words, manufactured upper wall 152 and manufactured lower wall 154 can be parallel or convergent.

A minimum length for manufactured upper wall 152 and manufactured lower wall 154 is shown as first length L1, which is determined by calculating hydraulic diameter, Dh, of flow slots between adjacent terminal pedestals 144B. Hydraulic diameter, Dh, is equal to four times area A (i.e. cross sectional area of flow slot) divided by perimeter P (perimeter of flow slot) and can be expressed as: Dh=4A/P. First length L1 can be about 1.5-3 times hydraulic diameter Dh, and in the depicted embodiment first length L1 is about 1.5-2 times hydraulic diameter Dh. It is desirable to design manufactured upper wall 152 and manufactured lower wall 154 to have second length L2, which is greater than the minimum first length L1. Second length L2 is equal to first length L1 plus third length L3. Third length L3 represents tolerance for core position and airfoil length and this tolerance can be equal to about 10-30 mils. In the depicted embodiment, third length L3 is about 20 mils. Accordingly, upper manufactured upper wall 152 and manufactured lower wall 154 are designed to have second length L2, which is equal to first length L1 (1.5-2 Dh) plus third length L3 (tolerance of 20 mils). Upstream end 148 can be manufactured such that under minimum blueprint tolerances, the constant area flow metering section maintains a minimum metering length in the flow direction greater than or equal to 1.5 hydraulic diameters of the slot flow area. This will ensure that the coolant flow has enough geometric length to become fully developed under worse case core true position and manufacturing grinding tolerances to ensure true chord requirements (M-dimension) are met.

Once manufactured according to the above principles, terminal pedestal 144B can be coated with a thermal barrier coating. After coating terminal pedestal 144B may be thicker, particularly at more downstream locations, as shown in FIG. 7 by phantom lines. Manufactured upper wall 152, which was previously tapered, is coated to become coated upper wall 158 extending in a straight line from upstream end 148 to manufactured downstream end 150. Similarly, manufactured lower wall 154, which was previously tapered, is coated to become coated lower wall 160 extending in a straight line from upstream end 148 to manufactured downstream end 150. In the depicted embodiment, coated upper wall 158 is parallel to coated lower wall 160. In alternative embodiments, terminal pedestals 144B are manufactured to have parallel upper and lower walls resembling coated upper wall 158 and coated lower wall 160. After coating, manufactured downstream end 150 is severed or cut-off of terminal pedestal 144B at a location at or near second length L2 to form an angular, blunt, or cut downstream end 162. Cut downstream end 162 is substantially perpendicular to, and forms an approximately right angle with, both coated upper wall 158 and coated lower wall 160.

It is desirable to place cut downstream end 162 at the trailing edge of an airfoil as possible to minimize flow area (i.e. maximize flow blockage) at the trailing edge. In one embodiment, the downstream end 162 is the airfoil trailing-edge as defined in the manufacturing process. Terminal pedestals 144B are left outside of the cast trailing-edge so that when the trailing-edge is machined, the terminal pedestals 144B terminate at the airfoil trailing-edge. As described above with reference to FIG. 6, cut downstream end 162 is aligned with an exit plane of trailing edge 104B, such that cooling air is guided to outlet 120B by terminal pedestal 144B. Terminal pedestals 144B can be manufactured such that they extend beyond the aerodynamic airfoil trailing edge tail point to ensure that a constant minimum flow area is maintained through to the trailing edge tail point. This will guarantee the coolant flow velocity is a maximum until the trailing edge exit plane until it is ejected and mixed with the freestream.

While the invention is described with reference to exemplary embodiments, it will be understood by those skilled in the art that various changes may be made and equivalents may be substituted without departing from the spirit and scope of the invention. In addition, different modifications may be made to adapt the teachings of the invention to particular situations or materials, without departing from the essential scope thereof. The invention is thus not limited to the particular examples disclosed herein, but includes all embodiments falling within the scope of the appended claims.

DISCUSSION OF POSSIBLE EMBODIMENTS

The following are non-exclusive descriptions of possible embodiments of the present invention.

An airfoil includes a leading edge, a trailing edge, a suction surface, a pressure surface, a cooling passageway, and a plurality of oblong pedestals. The suction surface and the pressure surface both extend axially between the leading edge and the trailing edge, as well as radially from a root section of the airfoil to a tip section of the airfoil. The cooling passageway is located between the suction surface and the pressure surface. The oblong pedestals connect the suction surface to the pressure surface at the trailing edge of the airfoil, and having oblong pedestals having a cut downstream end terminating at the trailing edge of the airfoil.

The airfoil of the preceding paragraph can optionally include, additionally and/or alternatively any, one or more of the following features, configurations and/or additional components:
    the plurality of oblong pedestals can be axially elongated;
    each of the plurality of oblong pedestals can have an axial length greater than 1.5 times a hydraulic diameter;
    the plurality of oblong pedestals can be arranged in a radial column;
    each of the plurality of oblong pedestals can be aligned such that the cooling fluid exiting the airfoil aligns with the local gaspath streamlines;
    each of the plurality of oblong pedestals can include a curved axially upstream end and an angular axially downstream end;
    the curved axially upstream end and the angular axially downstream end can be connected by two substantially parallel sides; and/or
    each of oblong pedestals can taper from the curved axially upstream end and the angular axially downstream end.

A component for a gas turbine engine includes an airfoil and a trailing edge cooling passageway. The airfoil includes a convex surface and a concave surface. Both the convex surface and the concave surface extend radially from an inner diameter to an outer diameter and axially from a leading edge to a trailing edge. Internal chambers are defined between the convex surface and the concave surface. The trailing edge cooling passageway extends axially through the internal chamber and has an outlet at the trailing edge. A radial column of axially elongated pedestals is positioned at the outlet, such that the pedestals terminate at an exit plane of the trailing edge cooling passageway.

The component of the preceding paragraph can optionally include, additionally and/or alternatively any, one or more of the following features, configurations and/or additional components:

- each elongated pedestal can have a curved upstream end and a blunt downstream end;
- the blunt downstream end can terminate at the trailing edge of the airfoil;
- a first radial column of first cylindrical pedestals can be positioned within the cooling passageway upstream of the radial column of axially elongated pedestals;
- the elongated pedestals can have diameters approximately equal to diameters of the first cylindrical pedestals;
- a second radial column of second cylindrical pedestals can be positioned within the cooling passageway upstream of the first radial column of cylindrical pedestals;
- the second cylindrical pedestals can have diameters equal to or greater than diameters of the first cylindrical pedestals;
- the second cylindrical pedestals can have diameters about 1.5 times greater than diameters of the first cylindrical pedestals;
- the airfoil can be a blade; and/or
- the airfoil can be a vane.

A method of manufacturing an airfoil can include forming a pedestal to include an rounded upstream end, a rounded downstream end, and tapered side walls connecting the upstream end to the downstream end. The method can also include coating the pedestal with a thermal coating thereby converting the tapered side walls into parallel side walls connecting the leading end to the trailing end.

The method of the preceding paragraph can optionally include, additionally and/or alternatively any, one or more of the following features, configurations and/or additional components:

- severing the rounded downstream end to form a blunt downstream end; and/or
- the airfoil can be a blade.

The invention claimed is:

1. An airfoil comprising:
    a leading edge and a trailing edge;
    a suction surface and a pressure surface, the suction surface and the pressure surface both extending axially between the leading edge and the trailing edge, as well as radially from a root section to a tip section of the airfoil;
    a cooling passageway located between the suction surface and the pressure surface; and
    a plurality of oblong pedestals connecting the suction surface to the pressure surface, the oblong pedestals having a cut downstream end perpendicular to a directly adjacent flowpath of the cooling passageway and connecting a downstream end of the pressure surface and a downstream end of the suction surface, the oblong pedestals terminating at the trailing edge of the airfoil.

2. The airfoil of claim 1, wherein the plurality of oblong pedestals are axially elongated.

3. The airfoil of claim 1, wherein each of the plurality of oblong pedestals has an axial length greater than 1.5 times a hydraulic diameter.

4. The airfoil of claim 3, wherein the plurality of oblong pedestals are arranged in a radial column.

5. The airfoil of claim 1, wherein each of the plurality of oblong pedestals is aligned such that a cooling fluid exiting the airfoil aligns with local gaspath streamlines.

6. The airfoil of claim 1, wherein each of the plurality of oblong pedestals includes a curved axially upstream end and an angular axially downstream end.

7. The airfoil of claim 6, wherein the curved axially upstream end and the angular axially downstream end are connected by two substantially parallel sides.

8. The airfoil of claim 6, wherein each of oblong pedestals tapers from the curved axially upstream end and the angular axially downstream end.

9. A component for a gas turbine engine, the component comprising:
    an airfoil including a pressure surface and suction surface, both the pressure surface and the suction surface extending radially from an inner diameter to an outer diameter and axially from a leading edge to a trailing edge, wherein an internal chamber is defined between the pressure surface and the suction surface; and
    a cooling passageway extending axially through the internal chamber and having an outlet at the trailing edge, wherein a radial column of axially elongated pedestals includes at least one pedestal having a downstream end perpendicular to a directly adjacent flowpath of the cooling passageway such that the downstream end of the at least one pedestal terminates at an exit plane of the trailing edge cooling passageway.

10. The component of claim 9, wherein each elongated pedestal has a curved upstream end and a blunt downstream end.

11. The component of claim 10, wherein the blunt downstream end terminates at the trailing edge of the airfoil.

12. The component of claim 11, further comprising:
    a first radial column of first cylindrical pedestals positioned within the cooling passageway upstream of the radial column of axially elongated pedestals.

13. The component of claim 12, wherein the elongated pedestals have diameters equal to diameters of the first cylindrical pedestals.

14. The component of claim 12, further comprising:
    a second radial column of second cylindrical pedestals positioned within the cooling passageway upstream of the first radial column of cylindrical pedestals.

15. The component of claim 14, wherein the second cylindrical pedestals have diameters equal to or greater than diameters of the first cylindrical pedestals.

16. The component of claim 14, wherein a diameter ratio of the second cylindrical pedestals to the first cylindrical pedestals is between about 2:1 and 1:1.

17. The component of claim 14, wherein the radial column of axially elongated pedestals is aligned such that slots formed between pedestals are parallel to an external airfoil local trailing edge surface momentum boundary layer streamline.

18. The component of claim 14, wherein the radial column of axially elongated pedestals are aligned such that a first slot formed between a first pair of adjacent pedestals is oriented in a direction substantially parallel to a second slot formed between a second pair of adjacent pedestals.

19. A method of manufacturing an airfoil, the method comprising:
    forming a pedestal to include a rounded upstream end, a rounded downstream end, and tapered side walls connecting the upstream end to the downstream end;
    coating the pedestal with a thermal coating thereby converting the tapered side walls into parallel side walls connecting the upstream end to the downstream end; and
    severing the rounded downstream end to form a blunt downstream end;

wherein the blunt downstream end is perpendicular to a directly adjacent flowpath of a cooling passageway located between a suction surface and a pressure surface of the airfoil.

20. The method of claim 19, wherein the airfoil is a blade.

* * * * *